(12) United States Patent
Kayano et al.

(10) Patent No.: US 6,618,323 B2
(45) Date of Patent: Sep. 9, 2003

(54) OPTICAL AXIS ADJUSTING DEVICE FOR VEHICLE HEADLAMP

(75) Inventors: Masayuki Kayano, Kawasaki (JP); Nobuaki Takeda, Tokyo (JP); Shinya Matsuura, Tokyo (JP)

(73) Assignee: Mitsubishi Fuso Truck and Bus Corporation, Tokyo (JP)

( * ) Notice: Subject to any disclaimer, the term of this patent is extended or adjusted under 35 U.S.C. 154(b) by 0 days.

(21) Appl. No.: 10/279,925

(22) Filed: Oct. 25, 2002

(65) Prior Publication Data
US 2003/0090960 A1 May 15, 2003

(30) Foreign Application Priority Data
Oct. 30, 2001 (JP) .......................... 2001-331874

(51) Int. Cl.$^7$ ............................ B60Q 1/10; G01S 15/00
(52) U.S. Cl. ........................... 367/96; 362/465; 362/37; 367/13
(58) Field of Search ........................... 367/95, 96, 99, 367/13; 362/37, 40, 464, 465

(56) References Cited

U.S. PATENT DOCUMENTS

| | | | | |
|---|---|---|---|---|
| 4,225,950 A | * | 9/1980 | Kotera et al. | 367/96 |
| 5,877,680 A | * | 3/1999 | Okuchi et al. | 340/468 |
| 6,229,263 B1 | * | 5/2001 | Izawa | 315/80 |
| 6,302,553 B1 | * | 10/2001 | Izawa | 362/465 |

FOREIGN PATENT DOCUMENTS

JP      10-181426      * 10/1998

* cited by examiner

Primary Examiner—Ian J. Lobo
(74) Attorney, Agent, or Firm—Birch, Stewart, Kolasch & Birch, LLP

(57) ABSTRACT

An optical axis adjusting device for a vehicle headlamp judges an inclined state of the vehicle on the basis of detection of an ultrasonic sensor of a vehicle, and performs an optical axis adjustment of a headlamp. In order to accurately judge the inclined state and to suitably adjust the optical axis of the headlamp, with respect to the detection by the ultrasonic sensor, a factor hindering its accurate detection is detected, and when it is judged that the ultrasonic sensor can not perform an accurate detection, the optical axis adjustment of the headlamp is suspended.

13 Claims, 7 Drawing Sheets

OPTICAL AXIS ADJUSTING DEVICE FOR VEHICLE HEADLAMP

CROSS REFERENCE TO RELATED APPLICATION

This non-provisional application claims priority under 35 U.S.C. §109(a) on Patent Application No. 2001-331874 filed in Japan on Oct. 30, 2001, which is herein incorporated by reference.

BACKGROUND OF THE INVENTION

1. Field of the Invention

The present invention relates to an optical axis adjusting device for adjusting an optical axis of a headlamp in accordance with an inclined state of a vehicle.

2. Description of the Related Art

When an optical axis adjustment of a headlamp is insufficient, a driver of an oncoming vehicle may be dazzled by the headlamp.

Conventionally, various techniques for preventing a driver of an oncoming vehicle from being dazzled by a head light have been studied including adjusting of an optical axis of the headlamp in accordance with an inclined state of the vehicle with respect to the ground.

In this conventional art, a signal output from an ultrasonic sensor and reflected by the ground is received, so that a distance between the ultrasonic sensor and the ground is measured. The ultrasonic sensor measures the distance at the front and the rear of the vehicle, and the inclined state of the vehicle with respect to the ground is judged on the basis of a difference between the two distances. When a road surface is an unpaved road surface, the an accurate judgment of the inclined state of the vehicle with respect to the ground is regarded as being difficult, and the optical axis adjustment is prohibited.

However, there are circumstances, where the detection by the ultrasonic sensor cannot be accurately made because of a surrounding environment of the vehicle. For example, sound and rain may interfere with the distance detection. In the case of the sound, the sound and a signal wave output from the ultrasonic sensor may interfere with each other, causing its waveform to be distorted, and the signal wave received by the ultrasonic sensor becomes inaccurate.

In the case of rain, the reflectivity of the road surface to the signal wave output from the ultrasonic sensor is low, and the received signal wave can be inaccurate.

Accordingly, in the foregoing conventional art, in the case where the signal wave detected by the ultrasonic sensor may be inaccurate due to the surrounding environment, the judgment as to whether or not the road surface is the unpaved may become inaccurate, and therefore, the judgment of the optical axis adjustment of the headlamp may also become inaccurate.

SUMMARY OF THE INVENTION

The present invention has been conceived in view of the above circumstances, and its object is to provide an optical axis adjusting system for a headlamp, which utilizes and ultrasonic sensor for judging an inclined state of a vehicle and adjusting an optical axis of a vehicle headlamp, and in which the inclined state of the vehicle is accurately judged and the optical axis of the headlamp can be suitably adjusted.

In this invention, the inclined state of the vehicle with respect to the road surface is judged on the basis of the detection of the ultrasonic sensor, and the optical axis of the headlamp is adjusted from the judged inclined state. When a hindrance factor detection device for detecting an existence of a factor hindering the inclination detection by the ultrasonic sensor detects the hindrance factor, a control device suspends the optical axis adjustment of the headlamp.

According to the present invention, the optical axis of the headlamp is adjusted on the basis of the inclined state of the vehicle only when the ultrasonic sensor detects high accuracy data without the hindrance factor, and the optical axis adjusting device can be controlled with high accuracy.

BRIEF DESCRIPTION OF DRAWINGS

The present invention will become more fully understood from the detailed description given herein below and the accompanying drawings which are given by way of illustration only, and thus are not limitative of the present invention, and wherein.

DETAILED DESCRIPTION OF PREFERRED EMBODIMENTS

Hereinafter, embodiments of the invention will be described in detail with reference to the drawings.

Figure 1:
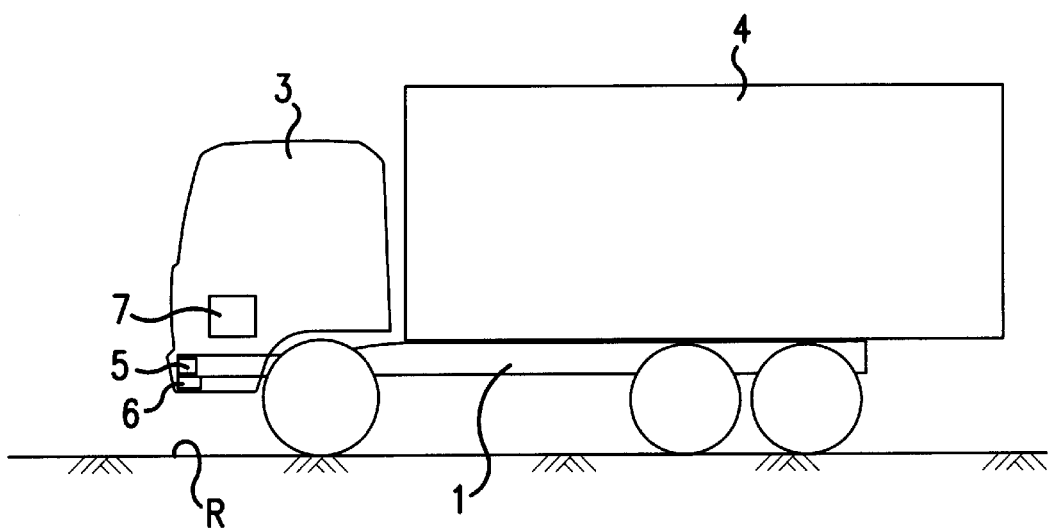
FIG. 1 is a schematic structural view of a truck on which an optical axis adjusting device for a vehicle headlamp according to an embodiment of the present invention is mounted.
Figure 2:
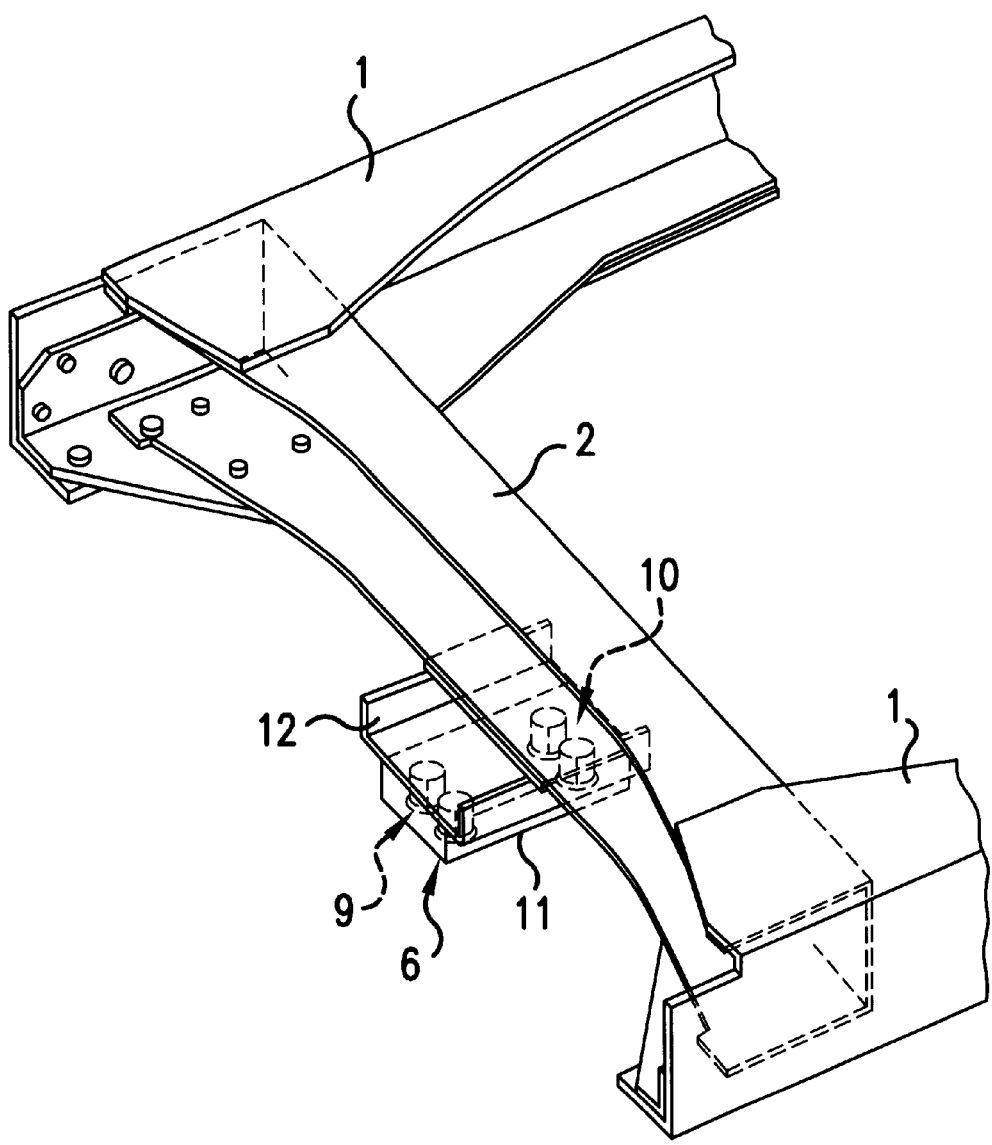
FIG. 2 is a schematic view of a frame at a front part of the truck showing an attachment state of an ultrasonic sensor.

In an optical axis adjusting device for a vehicle headlamp of this embodiment, as shown in FIGS. 1 and 2, plural cross members 2 (only one of which is shown in the drawing), orthogonal to a pair of right and left side frames 1, are attached to those side frames 1. The cross members 2 and the side frames 1 form a part of a frame of a vehicle. A cab 3 and a bed 4 are mounted on the frame such as the side frames 1 and the cross members 2. Right and left headlamps 5 are installed at the front end part of a vehicle, and an inclination sensor 6, as an inclination judgment device, is disposed substantially at the central portion of the cross member 2. A detection signal of the inclination sensor 6 is input to an ECU 7, provided as a control device, and in the ECU 7, an inclined state of a vehicle front part with respect to a road surface is judged on the basis of the detection information from the inclination sensor 6.

Figure 3:
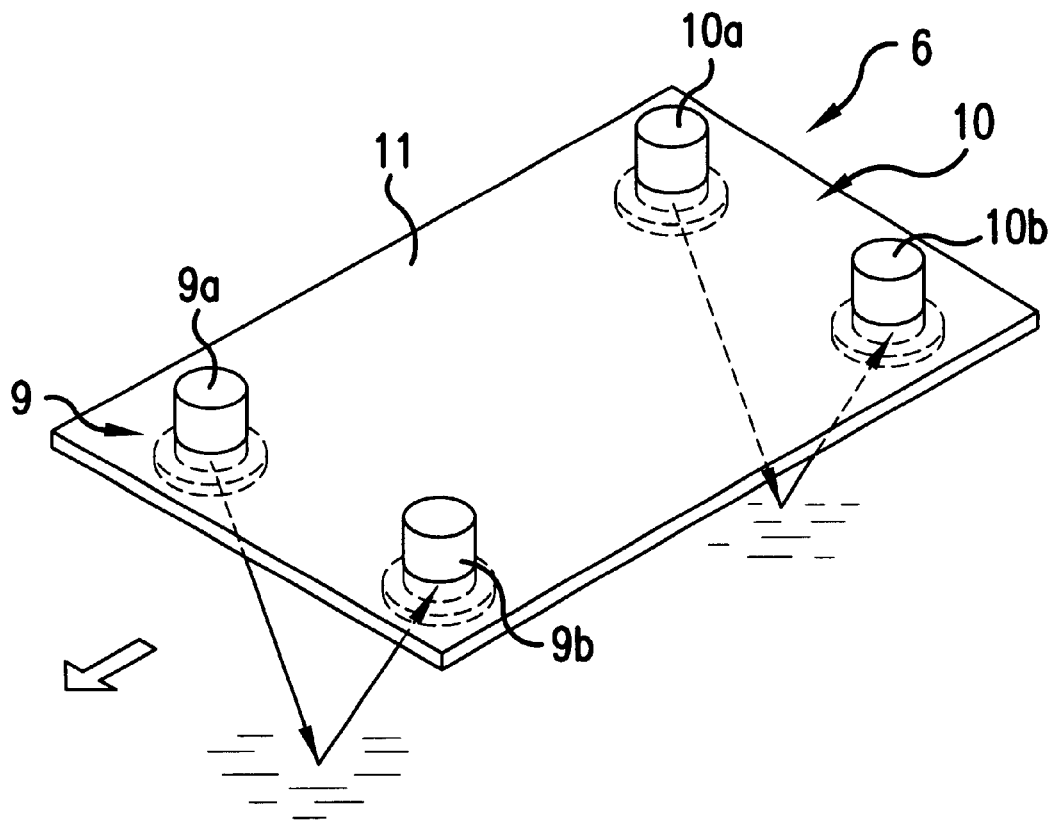
FIG. 3 is a schematic view showing the attachment state of the ultrasonic sensor.

Here, the inclination sensor 6 will be described in detail. As shown in FIGS. 2 and 3, the inclination sensor 6 includes ultrasonic sensors 9 and 10 for transmitting and receiving ultrasonic waves in a vehicle width direction. The sensors 9 and 10 include transmission sensors 9$a$ and 10$a$, as signal transmission parts, and reception sensors 9$b$ and 10$b$ as signal reception parts. The inclination sensor 6 may only have a single transmission sensor and two or more reception sensors.

The ultrasonic waves from the transmission sensors 9a and 10a are reflected by the road surface R and are received by the respective reception sensors 9b and 10b. The inclined state of the vehicle with respect to the road surface R is judged by the ECU 7 on the basis of a reception time difference between the reception sensors 9b and 10b.

A judgment method of the inclined state of the vehicle by the inclination sensor 6 will be described in detail with reference to FIGS. 4(a) and 4(b).

Figure 4A:
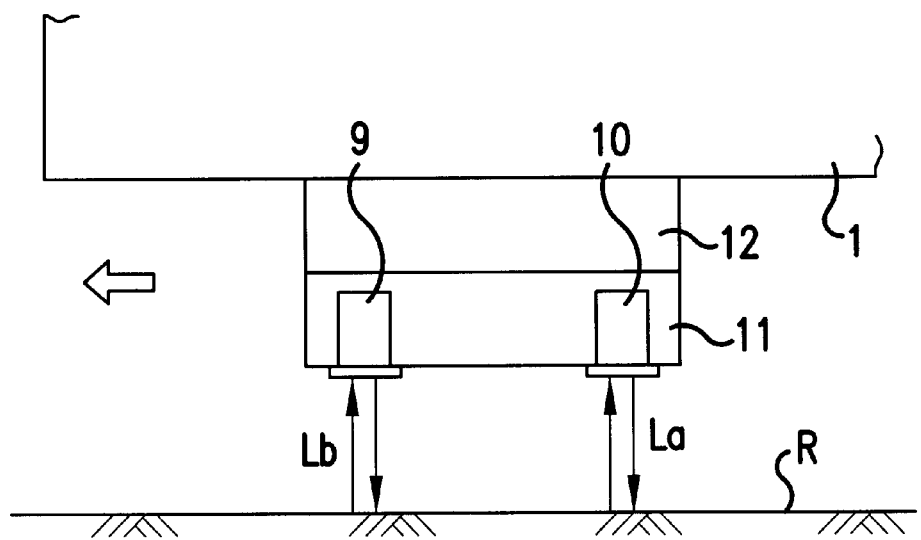
FIGS. 4($a$) and 4($b$) are explanatory views of a judgment method of an inclined state.
Figure 4B:
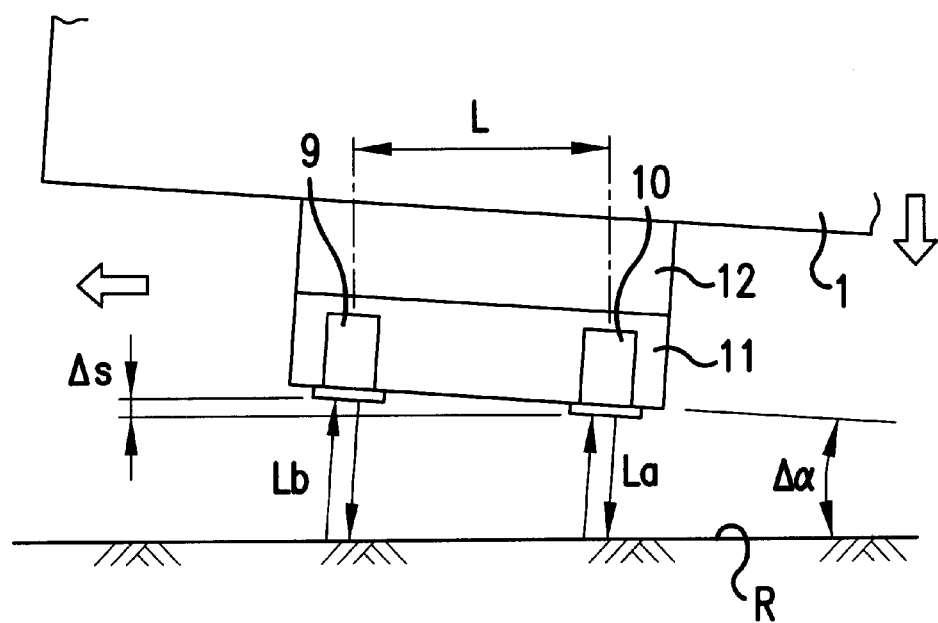

As shown in FIG. 4(a) in the case where the vehicle front part is not inclined with respect to the road surface R, the length of a passage La of the ultrasonic wave transmitted from the front transmission sensor 9a to the reception sensor 9b becomes equal to the length of a passage Lb of the ultrasonic wave transmitted from the rear transmission sensor 10a to the reception sensor 10b, and a reception time difference ΔT between the reception sensors 9b and 10b is zero. On the other hand, as shown in FIG. 4(b), in the case where a cargo is loaded onto the bed 4 such that the rear part of the vehicle sinks and the vehicle front part is inclined rearward (upward) with respect to the road surface R, the length of the passage La of the ultrasonic wave transmitted from the front transmission sensor 9a to the reception sensor 9a becomes longer than the length of the passage Lb of the ultrasonic wave transmitted from the rear transmission sensor 10a to the reception sensor 10b, and the reception time difference ΔT is produced between the reception sensors 9b and 10b.

In the case where the vehicle front part is inclined rearward as stated above, a distance difference ΔS is produced in a height direction between the transmission sensors 9a and 10a spaced apart from each other by a distance L. An inclination angle Δα can be obtained from the distance difference ΔS.

Accordingly, the ECU 7 judges the inclined state of the vehicle by deriving the distance difference ΔS on the basis of the reception time difference ΔT between the reception sensors 9b and 10b and calculates the inclination angle Δα.

Figure 5:
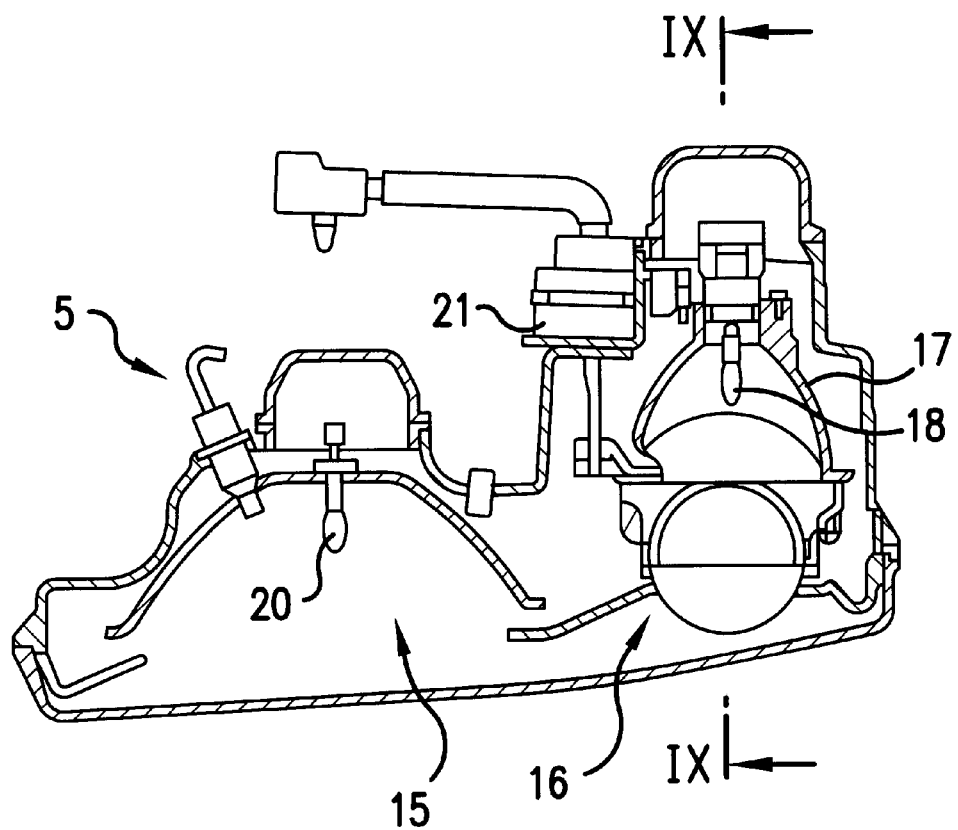
FIG. 5 is a horizontal sectional view of a headlamp portion in which an optical axis adjusting device is installed.
Figure 6:
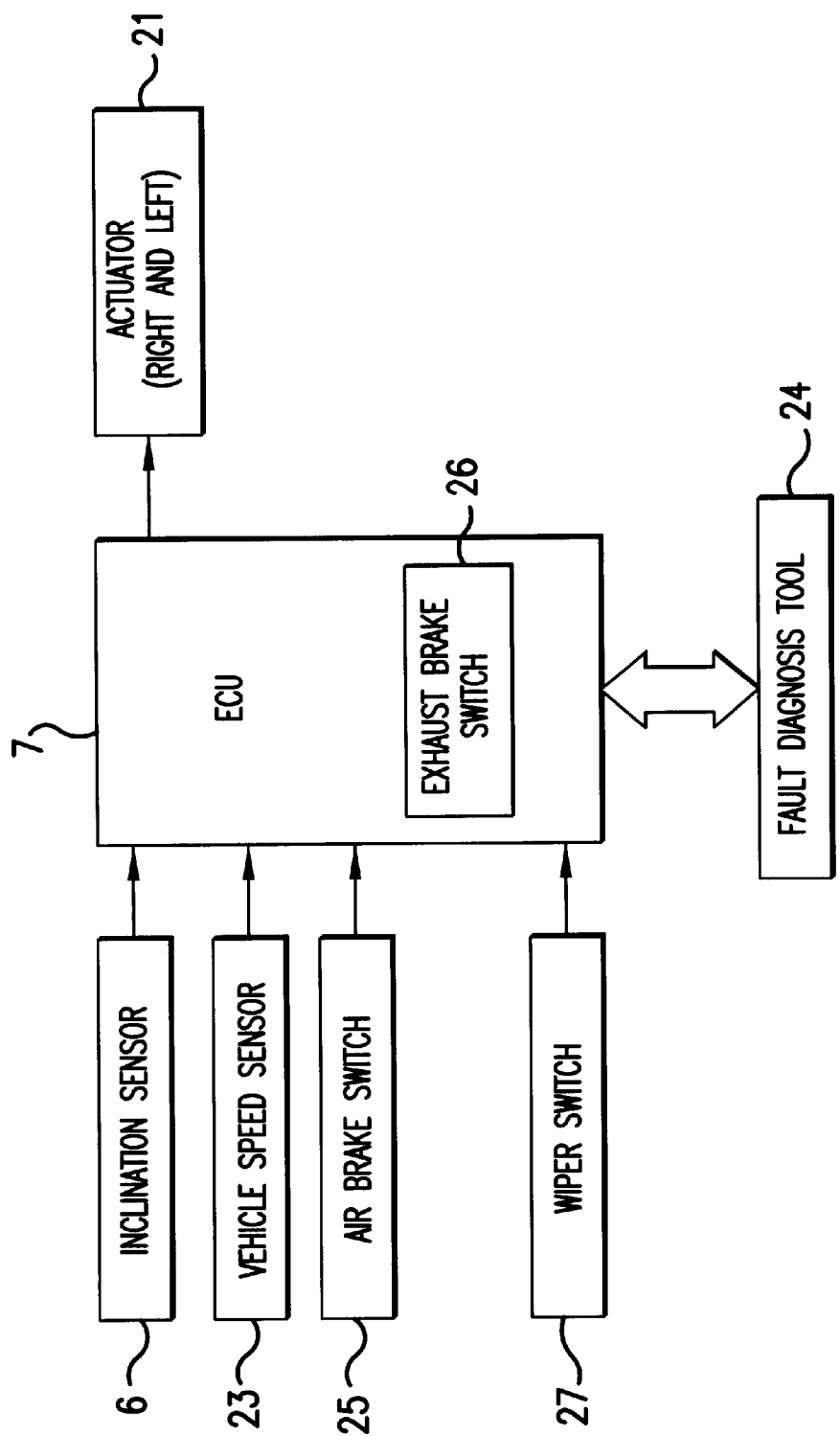
FIG. 6 is a control block diagram of the optical axis adjusting device of the present embodiment.

Next, the headlamp 5 and the optical axis adjusting device thereof will be described with reference to FIG. 5.

The headlamp 5 is constituted of a Hi side lamp 15 and a Low side lamp 16, and the Low side lamp 16 is, for example, a high intensity lamp (for example, a discharge headlamp). In the Low side lamp 16, a high intensity bulb 18 is attached to a reflector holder 17. The Hi side lamp 15 is provided with, for example, a halogen bulb 20. The high intensity bulb 18, together with the reflector holder 17, is tilted and driven by an actuator 21, provided as an optical axis adjusting device, and the optical axis is adjusted in the up-and-down direction. The actuator 21 is driven by instructions corresponding to the inclined state judged by the ECU 7, and the optical axis of the high intensity bulb 18 is adjusted.

There is a case where the ultrasonic sensor can not accurately receive a signal reflected from the road surface because of the surrounding environment of the vehicle. In the present embodiment, a hindrance factor detection device is provided as a device for detecting the existence of a factor hindering the detection by the ultrasonic sensor due to the reasons as stated above. As such a hindrance factor detection device, there are an abnormal sound detection device and a rain detection device.

Specifically, the inclination sensor 6 judges the inclined state of the vehicle with respect to the road surface R on the basis of the time difference between an ultrasonic wave emitted from the transmission sensor 9a, reflected by the road surface R, and received by the reception sensor 9b, and an ultrasonic wave emitted from the transmission sensor 10a, reflected by the road surface R, and received by the reception sensor 10b.

An air brake switch 25, which is installed in an air pressure line of an air brake, functions as an abnormal sound detection device that is turned ON during operation of the air brake. Information from the air brake switch 25 is input to the ECU 7. Alternatively, an exhaust brake switch 26, which functions as the abnormal sound detection device and electrically turned ON when an exhaust brake is operated, can be input. This exhaust brake switch 26 is electrically turned ON when a main switch, provided in a passenger compartment in the vicinity of a driver's seat and operated by a driver, is in an ON state, an accelerator pedal disposed in a vehicle compartment is OFF, a clutch for connecting/disconnecting a gearbox and an engine is OFF, and the gearbox (not shown) is in gear. Although the exhaust brake switch 26 is disposed inside the ECU 7 in this embodiment, it may be disposed outside.

Here, the air brake controls an air pressure by a brake valve and presses a brake shoe against a drum to effect braking. On the other hand, the exhaust brake is an auxiliary brake of the engine brake, and is operated by sending an air pressure in an air tank to a unit for closing a butterfly valve provided inside an exhaust pipe.

In this ECU 7, when the air brake switch 25 is ON, or the exhaust brake switch 26 is ON, the control of the optical axis adjusting device is suspended irrespective of the inclined state of the vehicle from the inclination sensor 6.

When the road surface is wet due to rain, the ultrasonic wave of the inclination sensor 6 is diffused by the road surface and the reception accuracy at the reception sensors 9b and 10b is lowered. Therefore, the correction of the inclination angle of the headlamp 5 is not carried out at the time of the rain. Information from a wiper switch 27, provided as a rain detection device, for operating a wiper device for wiping the rain on the window glass of the vehicle is input to the ECU 7, and when the wiper switch 27 has been turned on, the control of the optical axis adjusting device is suspended irrespective of the inclined state of the vehicle from the inclination sensor 6.

Figure 7:
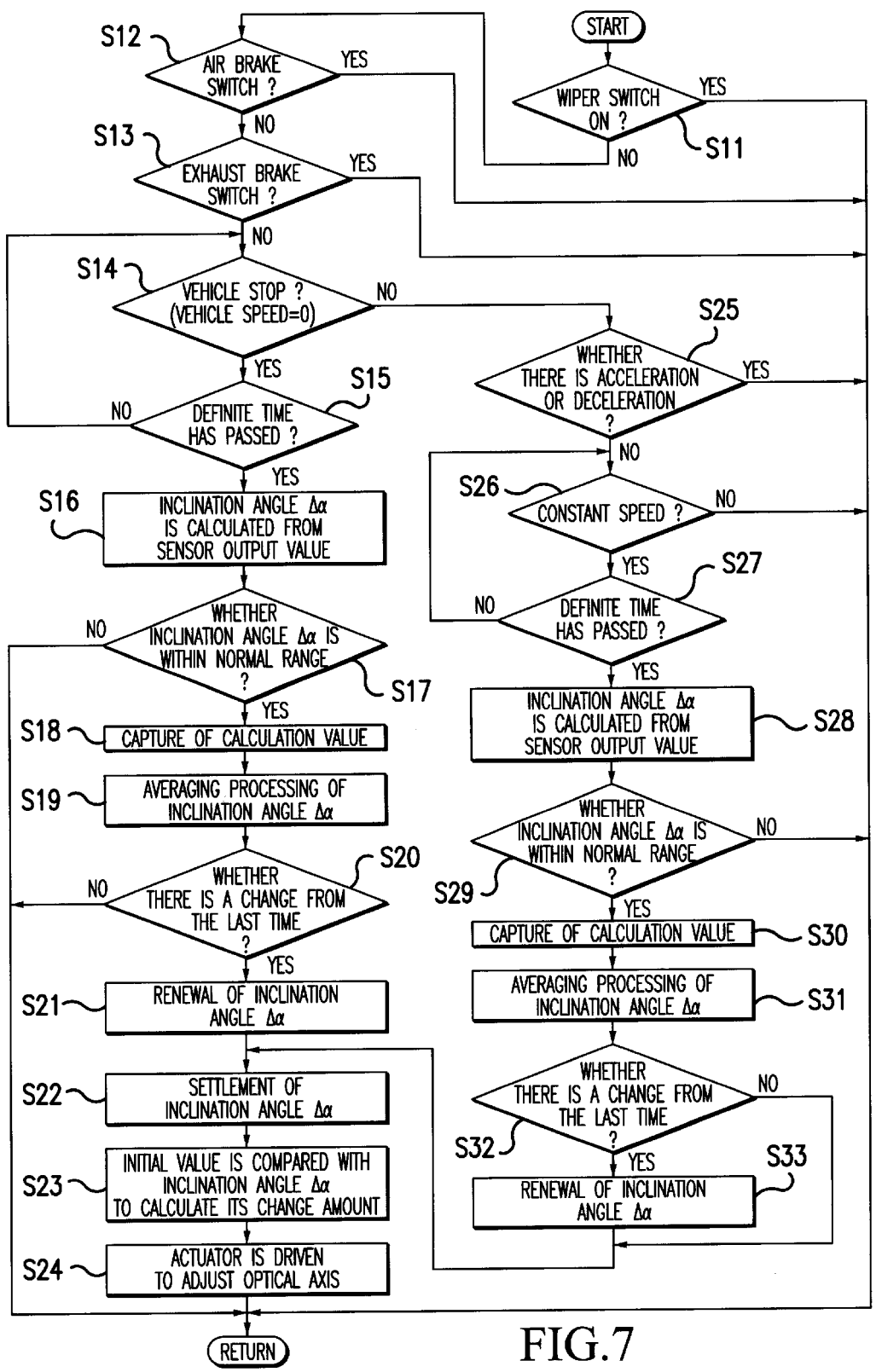
FIG. 7 is a flowchart showing an adjustment control by the optical axis adjusting device of the present embodiment.

Hereinafter, the control of the optical axis adjusting device of the headlamp will be described with reference to FIG. 7.

In step S11, whether or not the wiper switch 27 has been turned ON is judged. If the wiper switch 27 is ON, it is judged that the road surface R is wet due to rain, and that a high accuracy inclination judgment by the inclination sensor 6 can not be performed, and the procedure is directly returned. If the wiper switch 27 is OFF, the procedure proceeds to step S12. In step S12, it is judged whether or not the air brake switch 25 is ON, and in step S13, it is judged whether or not the exhaust brake switch 26 is ON. If either one of the air brake switch 25 and the exhaust brake switch 26 is ON, it is judged that a high accuracy inclination judgment by the inclination sensor 6 can not be performed because of the air discharge sound of the air brake or the exhaust sound by the exhaust brake, and the procedure is directly returned. If both the switches 25 and 26 are OFF, the procedure proceeds to step S14.

In step S14, on the basis of the detection result of a vehicle speed sensor 23, it is judged whether or not the vehicle is being stopped, and if the vehicle is being stopped, it is judged, in step S15, whether or not a first predetermined time has passed in the stop state. In the case where the first predetermined time has passed, the inclined state of the vehicle is detected in step S16. When the definite time has not passed, the inclined state of the vehicle is not detected.

In this step S16, by the foregoing calculation method, the inclination angle Δα is calculated on the basis of the output value of the inclination sensor 6. When it is judged in step S17 that this calculated inclination angle Δα is within a normal range, this calculated value is captured in step S18, and a plurality of inclination angles Δα, calculated once every predetermined interval, are averaged in step S19. When it is judged, in step S17, that the calculated inclination angle Δα is outside the normal range, it is judged that the output is abnormal because of the influence of roughness of the road surface or rain, and the procedure is directly returned without capturing the calculated value.

In step S20, it is judged whether or not the inclination angle Δα averaged in step S19 has changed from the previous inclination angle Δα obtained during the previous stop state of the vehicle. If it has changed, the inclination angle Δα obtained at this time in step S21 is renewed, and if it has not changed, the procedure is directly returned. Then, in step S22, the renewed inclination angle Δα of the vehicle in the stop state is settled, and in step S23, the inclination angle Δα of the foregoing initial value is compared with the settled inclination angle Δα to calculate a change amount of both inclination angles. Further, in step S24, the actuator 21 is driven on the basis of the change amount, and the optical axis of the high intensity bulb 18 is adjusted such that the inclination angle of the headlamp 5 is corrected.

When the vehicle starts to travel, and the traveling state of the vehicle is judged in step S14 on the basis of the detection result of the vehicle speed sensor 23, and when it is judged in step S25 that there is no acceleration or deceleration of the vehicle, the procedure proceeds to step S26. In step S26, it is judged whether the vehicle is traveling at a constant speed. When the vehicle is traveling at a constant speed, it is judged in step S27 whether or not a second predetermined time has passed. That is, in the acceleration or deceleration state of the vehicle, since the vehicle is tiled forward or backward by the forward or backward acceleration applied to the vehicle, there is a possibility that a measurement error occurs in the detection result of the inclination sensor 6. In step S27, when the vehicle is running at a constant speed and the second predetermined time has passed, in step 28 and thereafter, the inclined state of the vehicle is detected, and in the case where the second predetermined time has not passed in the constant speed state of the vehicle, the inclined state of the vehicle is not detected.

In this step S28, the inclination angle A Δα is calculated on the basis of the output value of the inclination sensor 6, and in the case where it is judged in step S29 that the calculated inclination angle Δα is within the normal range, this calculated value is captured in step S30, and a plurality of inclination angles Δα calculated once every predetermined interval are averaged in step S31. In step S32, it is judged whether or not the inclination angle Δα averaged in step S31 is changed from the previous inclination angle Δα obtained during the constant speed state of the vehicle. If it has changed, the inclination angle Δα obtained this time is renewed in step S33. If it has not changed, the procedure proceeds to step S22.

In step S22, similarly to the foregoing, the renewed or previous inclination angle Δα during the constant speed state of the vehicle is settled, in step S23, the foregoing inclination angle Δα of the initial value and the settled inclination angle Δα are compared with each other to calculate the change amount of both inclination angles, and in the step S24, the actuator 21 is driven on the basis of the change amount, and the optical axis of the high intensity bulb 18 is adjusted such that the inclination angle of the headlamp 5 is corrected.

Further, since it is the driver of an oncoming vehicle that is dazzled by the headlamp 5, it is more effective if the inclination angle Δα of the vehicle during traveling is detected to correct the inclination angle of the headlamp 5. Incidentally, it is more desired to use weighted means for the foregoing averaging processing in steps S19 and S31, a statistical processing using a standard deviation may be adopted. During the traveling state of the vehicle, cargo is not loaded or not unloaded from the bed 4. Therefore, in this way, a high accuracy inclination angle Δα can be detected by averaging the detection values (inclination angle Δα) of the inclination sensor 6, and the inclination angle of the headlamp 5 can be suitably corrected on the basis of this inclination angle Δα.

As stated above, in the optical axis adjusting device for the vehicle headlamp according to this embodiment, an abnormal sound, such as a brake operation sound or an engine sound, generated from the vehicle, has a great influence on an ultrasonic wave. Therefore, there is a fear that the ultrasonic waveform is distorted and accurate detection can not be performed. Accordingly, when the air brake switch 25 or the exhaust brake switch 26 is turned ON and the exhaust sound is produced, the ECU 7 suspends the correction of the inclination angle of the headlamp 5.

Accordingly, in the case where the abnormal sound, such as the air discharge sound of the air brake or the exhaust sound of the exhaust brake, is produced and there is a fear that the detection accuracy of the inclination sensor 6 is lowered, the inclination angle of the headlamp 5 is not corrected. Therefore, only when the inclination sensor 6 detects high accuracy data, the inclination angle of the headlamp 5 is corrected on the basis of the inclined state of the vehicle, and the high accuracy optical axis adjusting control is enabled.

As described above, according to the present invention, generation of an abnormal sound can be detected from the existing switch etc. without using a specific device such as a microphone, and the optical axis of the headlamp can be suitably adjusted by only adding the control.

Incidentally, in the above embodiment, although the abnormal sound detection device utilizes the air brake switch 25 and the exhaust brake switch 26, it is not limited to these switches, and irrespective of the exhaust sound of the brake, an operation sound of a gearbox or an engine may be directly detected, and the optical axis adjusting control may be suspended on the basis of its volume or frequency.

Besides, in the foregoing embodiment, although the rain detection device utilizes the wiper switch 27 as the operation switch for operating the wiper device, it is not limited to such a switch, and it may be a rain sensor that has a raindrop sensor for directly detecting a rainfall in the surrounding area of the vehicle. Further, the rain detection device may be a receiver mounted on the vehicle that receives information regarding the road environment in which the vehicle travels, and a beacon disposed at a side of a road, for example, to detect whether or not the road on which the vehicle is traveling is raining based on the received information.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An optical axis adjusting device for a vehicle headlamp, which judges an inclined state of a vehicle with respect to a road surface on the basis of detection of an ultrasonic sensor and adjusts an optical axis of the headlamp based on the inclined state, comprising:

a hindrance factor detection device that detects a factor hindering the detection by the ultrasonic sensor; and a control device that suspends the optical axis adjustment of the headlamp when the hindrance factor is detected by the hindrance factor detection device.

2. An optical axis adjusting device for a vehicle headlamp according to claim 1, wherein the hindrance factor detection device is an abnormal sound detection device that detects an abnormal sound state generated from the vehicle.

3. An optical axis adjusting device for a vehicle headlamp according to claim 2, wherein the abnormal sound detection device is an air brake switch for detecting operation of an air brake.

4. An optical axis adjusting device for a vehicle headlamp according to claim 2, wherein the abnormal sound detection device is an exhaust brake switch for detecting operation of an exhaust brake.

5. An optical axis adjusting device for a vehicle headlamp according to claim 1, wherein the hindrance factor detection device is a rain detection device for detecting a raining state.

6. An optical axis adjusting device for a vehicle headlamp according to claim 5, wherein the rain detection device is an operation switch of a wiper device for wiping rain on a window glass of the vehicle.

7. An optical axis adjusting device for a vehicle headlamp according to claim 5, wherein the rain detection device is a rain sensor for detecting the raining state in an area surrounding the vehicle.

8. An optical axis adjusting device for a vehicle headlamp according to claim 5, wherein the rain detection device is a reception device for receiving information regarding a road surrounding the vehicle, and the reception device detects, from the received information, that the road on which the vehicle is traveling is in a raining state.

9. An optical axis adjusting device for a vehicle headlamp according to claim 1, wherein the ultrasonic sensor includes at least one signal transmission part for transmitting a sound wave and at least two signal reception parts for receiving the sound wave reflected from a road surface, and the control device judges the inclined state of the vehicle on the basis of a difference between a time at which one of the at least two signal reception parts has received the sound wave and a time at which another of the at least two signal reception parts has received the sound wave.

10. An optical axis adjusting device for a vehicle headlamp according to claim 1, wherein the control device averages inclination angles indicative of judged inclined states, and adjust the optical axis of the headlamp in accordance with a difference between a judged inclination angle and an average value of the inclination angles.

11. An optical axis adjusting device for a vehicle headlamp, comprising:

an inclination sensor that detects an inclined state of a vehicle with respect to a road surface, said inclination sensor emits a sound wave and receives the sound wave reflected by a the road surface to determine the inclined state of the vehicle;

an actuator for adjusting an optical axis of the headlamp based on the detected inclined state of the vehicle;

a hindrance factor detection device that detects a factor hindering the detection by the inclination sensor; and a control device that suspends adjustment of the optical axis when the hindrance factor is detected.

12. An optical axis adjusting device for a vehicle headlamp, according to claim 11, wherein said sound wave is an ultrasonic sound wave.

13. A method of adjusting an optical axis adjusting device for a vehicle headlamp, comprising:

detecting an inclined state of a vehicle with respect to a road surface by emitting a sound wave and receiving the sound wave reflected by a the road surface to determine the inclined state of the vehicle;

adjusting an optical axis of the headlamp based on the detected inclined state of the vehicle;

detecting a factor hindering the detection of the inclined state; and suspending adjustment of the optical axis when the hindrance factor is detected.

* * * * *